3,215,515
METHOD OF INCREASING THE CHEMICAL
RESISTANCE OF GLASS SURFACES
Frank R. Bacon, Toledo, Ohio, assignor to Owens-Illinois, Inc., a corporation of Ohio
No Drawing. Continuation of application Ser. No. 712,635, Feb. 3, 1958. This application Aug. 14, 1964, Ser. No. 389,770
4 Claims. (Cl. 65—30)

This application is a continuation of co-pending patent application Serial No. 712,635, filed by me on February 3, 1958, now abandoned, and entitled "Chemical Resistance of Glass Surfaces."

My invention relates to improving the chemical resistance or durability of glass surfaces by and through the process of changing the chemical attributes of such surfaces and in particular by changing the chemical composition thereof.

The present invention further relates to the orientation of the several chemical components which form such surface areas and to the accomplishment of such orientation during the process of forming such surface areas from molten glass.

This invention also encompasses the improvement of the chemical durability of such surface areas subsequent to their original formation, either immediately thereafter and while at temperatures sufficiently great to allow ionic migration therein or by raising the temperature of such surface areas to temperatures conducive to the migration of ions or atoms.

It is presently known in the art to enhance the chemical resistance of glass surfaces by and through the superposing or accumulation of certain chemical components thereupon, by spraying or diffusion thereon or therein, by either a hot or cold method. However, it is not known in the art to create a chemical change in glass surfaces by the process of extracting from said surfaces certain of the chemical components found therein. Such extraction removes from these surface areas a certain component or components considered to be more susceptible to attack or to attacking materials coming into physical contact therewith. This removal necessarily changes the physical and chemical make-up of the surface areas in question and such change produces a beneficiation or a chemically increased resistance to contaminating contact.

As one definition of the result of this present invention, reference is made to the difference as between sulphur treatment and treatment with dry air. For example, in the sulphur treatment the alkalis are brought to the surface in the form of a bloom of $Na_2SO_4$. However, in this present invention the treatment with dry air apparently does not bring about deposition on the surface of the glass of any of the chemical components of the glass composition. It would appear that the flow of dry air over the hot glass surface speeds the evaporation of sodium oxide therefrom just as a current of air promotes evaporation from the surface of warm water in an open pan. A depletion of alkali at and near the glass surface results in enhanced chemical resistance. Dry air (or other inert dry gas) must be used. One theory to explain the essentiality of dryness of the air is set forth hereinafter.

As one example of this process of beneficiation of glass surfaces, reference is made to the production of glass containers, such as glass bottles. The process utilized to make the bottles is of no particular interest in this invention except that one form of application of the process will involve the step of expanding a parison to final form in a final or blow mold. During such production of a container, it is contemplated to use dry air either for the complete blowing process, at least during some portion thereof, or during a period subsequent to the final expansion. In this manner the glass forming the innermost or central portions of the parison or container will be at temperatures sufficiently high to permit diffusion or evaporation of certain chemical components, at or in the hot surface areas, when such surface areas are brought into contact with the gaseous medium used during or subsequent to the expansion, namely, dry air. For the purpose of this application, the term "dry air" is taken to mean air having an absolute humidity not exceeding 0.003 pound of moisture per pound of air. Thus, the maximum permissible water content of the dry air is on a weight basis unaffected by changes in temperature. However, air of much lower moisture content is readily prepared and preferred. The preferred commercially used dry air should have a humidity of not over 0.0001 pound moisture per pound of air.

The temperature of the glass surface to be contacted by the dry air will vary over a considerable range, such range depending upon various factors such as the type or composition of the glass, the size of the parison and the method utilized to form the glass parison but in no event will the temperature of the glass surface be more than 1000° F., above or 100° F. below the annealing temperature of the specific glass being worked.

For example, in a liquor bottle, commonly known as a fifth, made on the well known Owens suction machine, the temperature of the glass forming the inner or central portion of the parison will be found to be approximately 1950° F. and during the blowing process this temperature will decrease to approximately 1400° F. by the time it is completely blown. At a period during or subsequent to the formation of the inner surface of the bottle, the regular blow air will be replaced by dry air having an absolute humidity of approximately 0.0001 pound moisture per pound of air. This dry air is permitted to pass into and out of the bottle in such manner as to flow over the inner surface areas thereof at a controlled rate, for a regulable period of time and with said period being regulable with respect to the water content of said air and the temperature of the glass surface at the time of application. While the mold remains closed the flow of air is readily controlled by adjustment of vents in the blow head and/or by adjustment of blow air pressure. In this specific instance the temperature of these inner surface areas was approximately 1450° F., the period of time of dry air contact was approximately ten (10) seconds, and the rate of flow of dry air was 0.77 cubic foot per minute, the moisture 0.0001 pound per pound of air.

The passage of this dry air over these inner surface areas will result in a diffusion of alkali to the surface and with the rate of such diffusion depending upon the degree of dryness of the purging air, rate and duration of flow of such dry air over the exposed surface areas, and the temperature of the surface area at that time. Ware treated in this manner is then passed through the usual annealing lehr and during such passage it may again be subjected to a dry atmosphere while at the annealing temperature or slightly in excess thereof. The result of such treatment is a further increase in surface resistance to chemical attack or an increased durability.

A further manner in which dry air may be utilized to improve the chemical resistance of the surface areas of glass articles resides in the use of such air, for example, in connection with hollow containers as they are removed from the forming machine and placed upon a transporting conveyor for movement to an annealing lehr. During their travel along the conveyor, the inner surface areas of such articles will be at a temperature such that they may be subjected to purging with dry air for a matter of seconds, for example, 10 to 15 seconds, and then allowed to pass through the regular lehr. In tests made carrying out the above method, as illustrated hereinafter, such articles showed that the average ASTM test B–W value for this conveyor application was reduced from 2.06 to 1.64 ml. 0.02 N $H_2SO_4$ per 100 ml. by this purging treatment. ASTM as used herein refers to the American Society of Testing Materials, reprint 354, and B–W refers to method BW as defined under A.S.T.M. designation C225–54.

It is also contemplated that the ware may be purged, as outlined immediately above, and covered in some manner such as with an aluminum foil cap and then processed through the regular lehr. In such tests the articles showed that the average ASTM test B–W value was reduced from 2.06 to 1.59 ml. 0.02 N $H_2SO_4$/100 ml. The results of these above mentioned tests are indicated in Table I below:

*Table I*

ASTM TEST B–W RESULTS ON L–8829 8-OZ. FLASK BRIEFLY PURGED (10 SEC.) WITH DRY AIR

[ASTM Test B–W (ml. N/50 $H_2SO_4$/100 ml.)]

| Dry Air Purged | | Regular Production—Uncapped in Lehr |
|---|---|---|
| Uncapped in Lehr | Capped in Lehr [1] | |
| 1.66 | 1.54 | 2.08 |
| 1.65 | 1.58 | 2.04 |
| 1.66 | 1.56 | 2.06 |
| 1.69 | 1.61 | 2.08 |
| 1.54 | 1.64 | 2.06 |
|  | 1.58 | 2.06 |
| [2] 1.64 | [2] 1.59 | [2] 2.06 |

[1] Aluminum foil used as cap.
[2] Average.

As a still further manner of carrying out the intent of this present invention the bottles may be blown on the forming machine by and through the use of dry air and then transferred to an annealing lehr through the chamber of which dry air is being passed. Under test such ware, namely, ware blown and annealed in dry air, will give an average ASTM B–W test of 0.94. Similar tests made on ware produced in the regular manner, that is, without any application of dry air whatsoever, as per Table I above, gives an average ASTM test B–W result of 2.06 ml. 0.02 N $H_2SO_4$ per 100 ml. This indicates approximately a 55% increase in chemical resistance of the surfaces treated with dry air.

It is also contemplated that this method be applicable to glass articles other than containers. For example, the surface areas of sheet glass may be so treated by applying this dry air to the surface of the sheet as formed and when it is at the temperature conducive to the accomplishment of the desired end result. Glass tubing may also be so treated internally during its formation.

From the preceding it appears quite certain that the chemical activity desired may be obtained by passing dry air over a heated glass surface and that the surface must be at a temperature near or above that required for annealing the particular glass composition involved.

It is, of course, well known that the annealing temperatures for lime glass reside within the range of 500 to 575° C. (932 to 1067° F.) As one authority for this range, reference is made to the publication "Glass, the Miracle Maker" by C. J. Phillips, published by the Pitman Publishing Corporation, New York, 1941. Consequently, such treatment with dry air should be carried out at a temperature not less than approximately 440° C. (824° F.) and in any event at a temperature sufficiently high to allow ionic migration at least in the surface areas of the glass article.

The phenomena here involved is not completely understood but it is believed that the dry air in passing over the glass surface at a given rate will pick up and carry away from said surface a portion or percentage of both the water and alkalis of the glass. As the rate of flow is increased or decreased, the amount of combined water and alkalis picked up by the dry air is, of course, proportionately increased or decreased. The above is predicated upon both the physical appearance, namely, the absence of any sort of a bloom, and the absence of any of the named chemical constituents of the glass remaining upon the surface thereof. Apparently depletion of water near or at the surface of the glass is an important feature of the process leading to improved chemical resistance because the use of air with an absolute humidity corresponding to warm humid weather results in no practical benefit. Perhaps as depletion of sodium oxide in the glass at or near the surface occurs, simultaneous depletion of water somehow avoids or retards replenishment of the surface with alkali diffusing forward from more remote regions of the glass. Regardless of the mechanism here involved, applicant does obtain an increase in the durability or chemical resistance of the glass surfaces by and through the application of dry air under conditions of temperature and time conducive to the obtaining of such increased resistance or durability. The terms "ionic migration" as used throughout the specification and claims shall be construed to mean the movement of an ion or atom or aggregation of atoms (e.g. $Na^+$, Na, $Na_2O$, $H_2O$) through the glass.

Modifications may be resorted to within the spirit and scope of the appended claims.

I claim:

1. The method of improving the chemical resistance of a surface area of a glass article which comprises forming a parison from which the ultimate article is to be formed, enclosing said parison in a blow mold and expanding same therein by subjecting said parison to dry air internally thereof and under superatmospheric pressure, the $H_2O$ content of said air being less than 0.0001 pound per pound of said air.

2. The method of improving the chemical resistance of a surface area of a glass article which comprises forming a parison from which the ultimate article is to be formed, enclosing said parison in a blow mold and expanding same therein by subjecting said parison to dry air internally thereof and under superatmospheric pressure, the $H_2O$ content of said air being less than 0.0001 pound per pound of said air and regulating the rate of flow and duration of application of said air.

3. A method of improving the chemical resistance of a surface area of a glass article which comprises forming a parison from which the ultimate article is to be formed, expanding said parison by the internal injection of gaseous medium internally thereof under superatmospheric pressure, and then annealing said glass article in the presence of and in contact with a gaseous medium, at least a portion of said blowing and at least a portion of said annealing being effected employing dry air as said gaseous medium where the $H_2O$ content of said medium is less than 0.0001 pound per pound of said medium while the temperature of said article on surfaces of said article contacted by said dry air is in the range from 100° F. below the annealing temperature to 1000° F. above the annealing temperature of the glass.

4. The method of improving the chemical resistance of a surface area of a glass article, which comprises placing dry air having an absolute humidity not exceeding 0.0001 pound of water per pound of gas in contact with the freshly formed surface area of said glass article while the temperature of said glass surface is between 1000° F. above and 100° F. below the annealing temperature of the glass for a period of time sufficient to improve the chemical resistance of said surface.

References Cited by the Examiner
UNITED STATES PATENTS

| | | | |
|---|---|---|---|
| 2,154,490 | 4/39 | Burch | 65—31 |
| 2,273,778 | 2/42 | Berthold | 65—69 |
| 2,279,168 | 4/42 | Kalisher et al. | 65—32 |
| 2,388,808 | 11/45 | White | 65—114 |
| 2,392,099 | 1/46 | Pollard | 65—32 |
| 2,612,726 | 10/52 | Nordberg | 65—32 |

FOREIGN PATENTS 506,124  5/39  Great Britain.

DONALL H. SYLVESTER, *Primary Examiner.*